United States Patent
Jenkins et al.

(10) Patent No.: US 9,964,793 B2
(45) Date of Patent: May 8, 2018

(54) DISSIPATION LAYER IN A DISPLAY DEVICE

(71) Applicant: Microsoft Technology Licensing, LLC, Redmond, WA (US)

(72) Inventors: Kurt Allen Jenkins, Sammamish, WA (US); Lincoln Matthew Ghioni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 15/051,062

(22) Filed: Feb. 23, 2016

(65) Prior Publication Data
US 2017/0242290 A1    Aug. 24, 2017

(51) Int. Cl.
G02F 1/1333 (2006.01)
F21V 8/00 (2006.01)

(52) U.S. Cl.
CPC ..... *G02F 1/133385* (2013.01); *G02B 6/0023* (2013.01); *G02B 6/0036* (2013.01); *G02B 6/0051* (2013.01); *G02B 6/0068* (2013.01); *G02F 1/13338* (2013.01); *G02F 1/133308* (2013.01); *G02F 2001/133314* (2013.01); *G02F 2001/133317* (2013.01); *G02F 2201/503* (2013.01); *G02F 2202/28* (2013.01)

(58) Field of Classification Search
CPC ........... G02F 1/133385; G02F 1/13338; G02F 2202/28; G02B 6/0023; G02B 6/0036; G02B 6/0051; G02B 6/0068
USPC ......................................................... 349/161
See application file for complete search history.

(56) References Cited

U.S. PATENT DOCUMENTS

| 7,220,036 B2 | 5/2007 | Yi et al. |
| 7,791,782 B2 | 9/2010 | Paolini et al. |

(Continued)

FOREIGN PATENT DOCUMENTS

| JP | 2004227941 A | * | 8/2004 |
| JP | 2005303114 A | * | 10/2005 |

(Continued)

OTHER PUBLICATIONS

"International Search Report & Written Opinion Issued in PCT Application No. PCT/US2017/017846", dated Apr. 19, 2017, 14 Pages.

(Continued)

*Primary Examiner* — Hoan C Nguyen
(74) *Attorney, Agent, or Firm* — Lempia Summerfield Katz LLC

(57) ABSTRACT

A dissipation or rigid support layer for a display device (such as a touch screen display device) is provided herein. The display device may include a display unit (e.g., a LCD unit and backlight unit), an internal electronics component, and a dissipation layer disposed between the display unit and the internal electronics component. The dissipation layer may be affixed to a surface of the display unit, and the dissipation layer may be configured to at least partially disperse a mechanical force applied by the internal electronics component on the display unit when an input force moves the dissipation layer into contact with the internal electronics component. In some examples, the dissipation layer is affixed to the surface of the display unit via an adhesive layer (e.g., an optically clear adhesive layer).

20 Claims, 5 Drawing Sheets

(56) References Cited

U.S. PATENT DOCUMENTS

| | | |
|---|---|---|
| 8,104,911 B2 | 1/2012 | Hillman et al. |
| 2008/0043413 A1 | 2/2008 | Okuda |
| 2009/0034275 A1* | 2/2009 | Cheng .................. F21K 9/00 362/373 |
| 2010/0177259 A1 | 7/2010 | Ichioka et al. |
| 2010/0220068 A1 | 9/2010 | Chen et al. |
| 2012/0105772 A1 | 5/2012 | Lim et al. |
| 2012/0113363 A1 | 5/2012 | Lim et al. |
| 2012/0162590 A1 | 6/2012 | Kim et al. |
| 2013/0258707 A1 | 10/2013 | Iwasaki et al. |
| 2014/0226091 A1 | 8/2014 | Dighde et al. |
| 2014/0254141 A1 | 9/2014 | McRae |
| 2014/0307207 A1 | 10/2014 | Ge et al. |
| 2015/0260908 A1* | 9/2015 | Kiguchi ............... G02B 6/0051 349/58 |
| 2015/0293388 A1 | 10/2015 | Tanaka et al. |
| 2016/0004121 A1* | 1/2016 | Inomata ............ G02F 1/133528 349/103 |
| 2016/0381317 A1* | 12/2016 | Hosoki ............. G02F 1/133308 349/65 |

FOREIGN PATENT DOCUMENTS

| | | |
|---|---|---|
| JP | 2008282615 A * | 11/2008 |
| KR | 2007038358 * | 4/2004 |
| WO | 2013080971 A1 | 6/2013 |

OTHER PUBLICATIONS

Walker, et al., "LCD In-Cell Touch", In Proceedings of Information Display, Mar. 2010, pp. 8-14.

U.S. Appl. No. 14/552,762, Timothy Large, "Laminated Backlight Unit", filed Nov. 25, 2014.

* cited by examiner

DISSIPATION LAYER IN A DISPLAY DEVICE

BACKGROUND

Current design trends for computing devices having touch screen interfaces such as tablets or mobile phones include designs having an increase in power, a decrease in size (e.g., thickness), and an increase in speed. As the thickness of the computing device is reduced, certain internal device components are positioned closer together. This provides for challenges in manufacturing design and thermal management.

Specifically, with regard to manufacturing design, current touch screen computing devices may have problems with visual distortions appearing on the display screen when an input force is applied to the display screen (e.g., via a finger or stylus). For example, a liquid crystal display (LCD) device may have problems with "pooling" when a user applies pressure to the display screen of the LCD device, wherein a realignment of liquid crystal molecules occurs. This input pressure alters the state of the affected crystals and thereby locally alters the image by color and/or intensity changes.

Visual distortion or pooling may occur at the location of the application of pressure, otherwise referred to as localized distortion or localized pooling. Additionally or alternatively, visual distortion or pooling may occur at a location where an internal device component (e.g., battery, processor, integrated circuit, printed circuit board) positioned beneath the display unit is pressed into the display unit when the user applies pressure to the screen. This distortion may be referred to as component distortion or component pooling. The component distortion may not necessarily be positioned beneath the location of applied pressure, which may be referred to as remote pooling. As such, the user operating the device may notice a distorted display at a position separate from the location of applied pressure and become concerned that something is wrong with the device. In some cases, the component distortion may mark or permanently damage the display unit, potentially creating a permanently distorted display.

SUMMARY

Dissipation or rigid backing layers for display devices are described herein. In one or more embodiments, the device includes a display unit, an internal electronics component, and a dissipation layer (also referred to as a backing layer) disposed between the display unit and the internal electronics component. The dissipation layer is affixed to a surface of the display unit, and the dissipation layer is configured to at least partially disperse a mechanical force applied by the internal electronics component on the display unit when an input force moves the dissipation layer into contact with the internal electronics component.

In another embodiment, the device includes a LCD unit, a laminated backlight unit, and a dissipation layer affixed to a surface of the laminated backlight unit. The laminated backlight unit is disposed between the LCD unit and the dissipation layer, and the dissipation layer is configured to at least partially disperse a mechanical force applied by an internal electronics component on the laminated backlight unit when an input force moves the dissipation layer into contact with the internal electronics component.

In another embodiment, the device includes a transparent cover, an internal electronics component, a LCD unit disposed between the transparent cover and the internal electronics component, a laminated backlight unit disposed between the LCD unit and the internal electronics component, and a dissipation layer disposed between the laminated backlight unit and the internal electronics component. The dissipation layer is affixed to a surface of the laminated backlight unit and separated by an air gap from the internal electronics component in a first state. Additionally, the dissipation layer is configured to move into contact with the internal electronics component when an input force is applied to the transparent cover in a direction toward the laminated backlight unit, defining a second state. Further, the dissipation layer is configured to at least partially disperse a mechanical force applied on the laminated backlight unit by the internal electronics component when the device is in the second state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
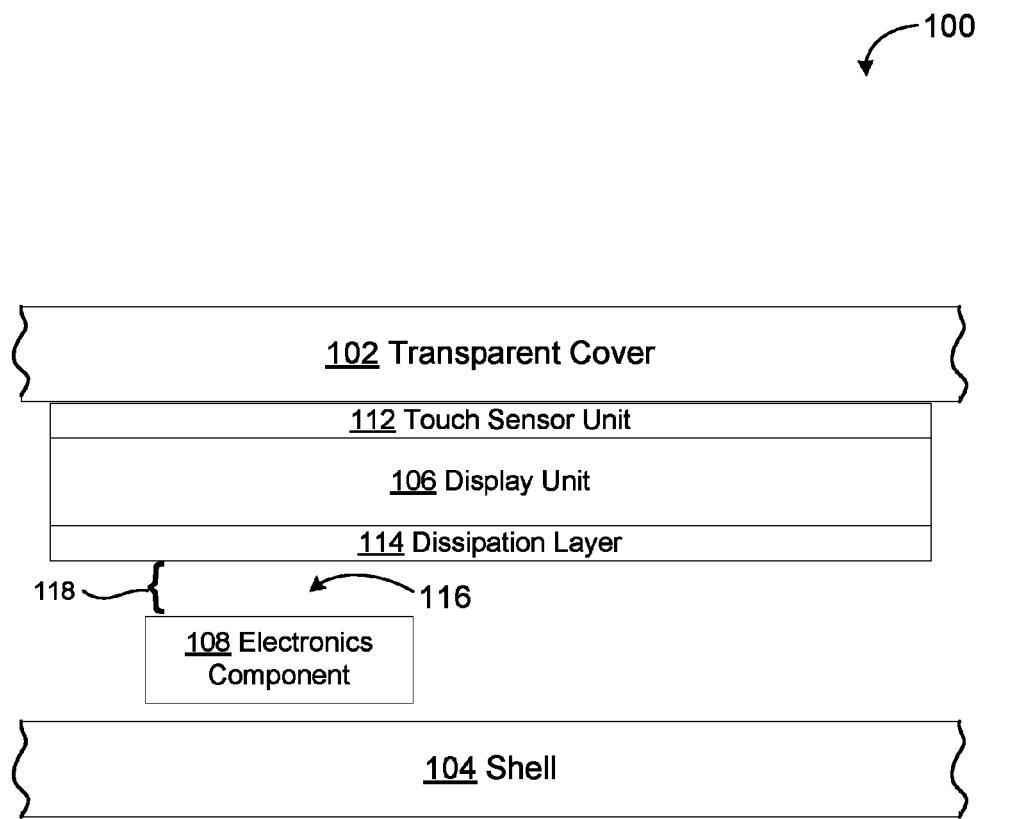
FIG. 1 depicts an example of an electronic device including a display unit and dissipation layer.

While the disclosed devices, systems, and methods are representative of embodiments in various forms, specific embodiments are illustrated in the drawings (and are hereafter described), with the understanding that the disclosure is intended to be illustrative, and is not intended to limit the claim scope to the specific embodiments described and illustrated herein.

DETAILED DESCRIPTION

Disclosed herein are devices, systems, and methods for minimizing damage to a display unit (such as visual distortions or pooling) in an electronic device. Such devices, systems, or methods have several potential end-uses or applications, including any electronic device having a display unit with an internal electrical component (e.g., a vapor chamber, heat pipe, heat sink, heat fin, battery, processor, integrated circuit, or printed circuit board) positioned beneath the display unit of the electronic device.

The electronic device may include a display unit, an internal electronics component, and a dissipation layer or backing layer disposed between the display unit and the internal electronics component. The dissipation layer is affixed to a surface of the display unit (e.g., via an adhesive layer). Additionally, the dissipation layer is a force dissipation layer configured to at least partially disperse a mechanical force applied by the internal electronics component on the display unit when an input force moves the dissipation layer into contact with the internal electronics component. This is advantageous over a similar electronic device without a dissipation layer, as the dissipation layer minimizes or eliminates visual distortions in the display unit that may be caused by the internal electronics component pressing into the display unit (such as when a user touches or provides input force on an external, transparent cover layer of the electronic device).

Such a dissipation layer may be useful in a variety of electronic devices, such as an electronic device having a display screen and, in some instances, a touch sensor unit. For example, the dissipation layer may be useful in any electronic device having a display unit positioned between the touch sensor unit and an internal electronics component. In some examples, the dissipation layer may be incorporated into a personal computer, server computer, tablet or other handheld computing device, laptop or mobile computer, communication device such as a mobile phone, multiprocessor system, microprocessor-based system, set top box, programmable consumer electronic, network PC, minicomputer, mainframe computer, or audio or video media player. In certain examples, the dissipation layer may be incorporated within a wearable electronic device, wherein the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

In certain examples, the display unit includes a liquid crystal display (LCD) unit and backlight unit. The backlight unit may be a laminated backlight unit, wherein the various layers of the backlight unit are adhered to each other via adhesion layers. Examples of laminated backlight units are described in further detail in U.S. patent application Ser. No. 14/552,762, herein incorporated by reference in its entirety. In other examples, the display unit includes a light emitting diode (LED) unit or an organic light emitting diode (OLED) unit.

The internal electronics component may include one or more of the following: a vapor chamber, heat pipe, heat sink, heat fin, battery, processor, integrated circuit, or printed circuit board. The electronic device may have an external, transparent cover (e.g., a glass layer) that covers the display unit. A touch sensor unit may be positioned beneath the transparent cover, disposed between the transparent cover and the display unit.

The dissipation layer or backing layer is made of one or more of the following compounds, compositions, or alloys thereof: steel (e.g., stainless steel), glass, ceramic, plastic, carbon-fiber reinforced plastic, aluminum, titanium, bronze, brass, copper, iron, beryllium, molybdenum, tungsten, silicon carbide, tungsten carbide, graphene, diamond, or carbyne. The dissipation layer may be made of a rigid or stiff material, which is advantageous in dispersing any mechanical force from the internal electronics component when pressed into the dissipation layer.

The amount of rigidity or stiffness of the material may be defined by the Young's modulus of the material (i.e., the ratio of stress to strain of a material). In certain examples, the dissipation layer has a Young's modulus of at least 25 kilonewtons per square millimeter ($kN/mm^2$). In other examples, the Young's modulus of the dissipation layer is at least 50 $kN/mm^2$, 75 $kN/mm^2$, or 100 $kN/mm^2$.

In some examples, the physical properties of the dissipation layer may be configured to be similar to certain physical properties of another layer of the electronic device (e.g., the transparent cover of the electronic device). The transparent cover may be adhered to the display unit or the touch sensor unit on one surface of the display unit, while the dissipation layer is adhered to the display unit on the opposite surface of the display unit. As such, it is advantageous for the transparent cover and the dissipation layer to have similar thermal properties (e.g., similar coefficients of linear thermal expansion). This is advantageous because if the layers on opposite sides of the display unit have similar coefficients of linear thermal expansion, the layers will expand and contract at similar rates, therein avoiding potential delamination problems. In certain examples, the coefficient of linear thermal expansion of the transparent cover is 0.1-10 times, 0.2-5 times, 0.5-2 times, 0.8-1.2 times, or 0.9-1.1 times the coefficient of linear thermal expansion of the dissipation layer.

The height or thickness of the dissipation layer, as measured in the z-direction of the electronic device, is also variable. The height or thickness may be configured to be as thin as possible while still providing stiffness to protect the display unit when moved into contact with an internal electronics component (such as when a user applies an input force on an external transparent cover). In other words, the height or thickness of the dissipation layer may be configured to dissipate a mechanical force from an internal electronics component. The height may also be determined based upon the amount of available internal space within the electronic device such that the chosen height does not add any thickness to the overall device. In some examples, the height of the dissipation layer is in a range from 1 micrometer ($\mu m$) to 1 mm, 1-100 $\mu m$, 10-100 $\mu m$, 1-50 $\mu m$, or 10-50 $\mu m$. In certain particular examples, the dissipation layer includes stainless steel or glass and has a height of 10-50 $\mu m$.

An electronic device may have a separation area positioned between the display unit and an internal electronics component. This separation area may include an air gap for heat dissipation from the internal electronics component (e.g., processor) and/or a foam layer for protecting the display unit and internal electronics component from damaging each other when compressed into each other. In certain examples, addition of the dissipation layer to the electronic device does not add thickness to the overall electronic device. Instead, the height of the separation area (e.g., air gap and/or foam layer) is reduced, for example, at least as much as the height of the dissipation layer. For example, an electronic device without a dissipation layer may have a separation area with a height of 0.7 mm (e.g., 0.4 mm of a foam layer and 0.3 mm of an air gap). Addition of a dissipation layer that is 50 $\mu m$ in height may reduce the overall separation area in half from 0.7 to 0.35 mm. In other words, the dissipation layer may be advantageous in reducing the thickness of the electronic device while still providing adequate protection for the display unit from the nearby internal electronics components.

In certain examples, a single continuous dissipation layer is adhered to at least a portion of a surface of the display unit. For example, the dissipation layer may cover at least 50%, 60%, 70%, 80%, 90%, 95%, or 100% of the surface of the display unit. A single continuous dissipation layer covering a majority of the surface of the display unit may be advantageous in protecting the majority of the display unit from potential damage from the internal electronics components as well as providing adequate heat dissipation.

In other examples, the dissipation layer comprises sections of material or sublayers affixed to the display unit and strategically positioned between the display unit and each internal electronics component that may come in contact with the display unit when an input force is applied to the external transparent cover of the device. For instance, one section of the dissipation layer may be affixed to the display unit to protect the display unit from the underlying battery, while a separate section of the dissipation layer may be affixed to the display unit to protect the display unit from the underlying processor or integrated circuit.

The dissipation layer may be affixed only on one surface of the display unit. Alternatively, the dissipation layer may be affixed on multiple surfaces of the display unit. For example, the dissipation layer may cover at least a portion of the surface of the display unit adjacent the internal electronics component and at least one side surface of the display unit adjacent to an edge of the electronic device, perpendicular to the surface of the display unit adjacent to the internal electronics component.

The dissipation layer may be adhered to the display unit via an adhesive layer disposed between the dissipation layer and the display unit. The adhesive layer may include one or more pressure-sensitive adhesive materials. Additional or alternative types of adhesive materials and films may be used, including, for instance, moisture or thermally cured adhesive materials. The adhesive materials may be silicone-based, epoxy-based and/or acrylic-based materials. The adhesive materials may be used to laminate adjacent layers of a stack of backlight unit layers. In certain examples, the adhesive layer may be an acrylic resin or an optically clear adhesive (OCA). The OCA may be a liquid optically clear adhesive or an optically clear adhesive tape. The OCA may be advantageous because the OCA is compatible with both surfaces and has smooth properties.

The height or thickness of the adhesive layer is configurable. In some examples, the height of the adhesive layer is in a range from 0.1-50 µm, 0.1-10 µm, 0.1-5 µm, or 1-5 µm.

Examples of a Dissipation Layer in a Display Device

FIG. 1 depicts a cross-sectional view of a portion of an electronic device 100. As depicted, the electronic device 100 includes a transparent cover 102, a shell 104, and a display unit 106 disposed between the transparent cover 102 and the shell 104. The transparent cover 102 may include or be composed of glass, plastic, and/or other transparent materials that permit a user of the electronic device to view images created by the display unit 106. In this example, the electronic device 100 includes at least one internal electronics component 108 disposed between the display unit 106 and the shell 104. In one example, the internal electronics component 108 is a battery. In another example, the internal electronics component 108 is a heat dissipation component such as a vapor chamber, heat pipe, heat sink, or heat fin. Alternatively, the internal electronics component 108 is a processor, integrated circuit, or printed circuit board. In certain examples, the at least one internal electronics component 108 is supported within the electronic device by an internal support. The at least one internal electronics component 108 may be adhesively or otherwise secured or mounted to the internal support. In other cases, the device 100 does not include an internal support.

The display unit 106 may be configured as a display module stack. The display module stack may include any number of optical layers or films. Each layer of the display unit 106 may be structurally supported by the internal support. In some examples, the display unit 106 includes a light emitting diode (LED) unit or an organic light emitting diode (OLED) unit. In other examples, the display unit 106 includes a liquid crystal display (LCD) unit and backlight unit. The backlight unit may be a laminated backlight unit, wherein the various layers of the backlight unit are adhered to each other via adhesion layers, as depicted in greater detail in FIG. 2.

In this example, the electronic device 100 includes a touch sensor unit 112 disposed between the transparent cover 102 and the display unit 106. The touch sensor unit 112 may include one or more layers formed on, applied to, or otherwise secured to the transparent cover 102 and/or the display unit 106.

As depicted in FIG. 1, the electronic device 100 includes a separation area 116 positioned between the display unit 106 and the internal electronics component 108. This separation area 116 may include an air gap for heat dissipation from the internal electronics component 108 (e.g., processor) and/or a foam layer for protecting the display unit 106 and internal electronics component 108 from damaging each other when compressed into each other. The height 118, as measured in the z-direction, of the separation area 116 is configurable based on the design specification of the electronic device 100. As noted above, the height 118 of the separation area 116 (e.g., air gap and/or foam layer) may be smaller in this electronic device 100 having a dissipation layer 114 (also referred to as a backing layer), in comparison with a similar electronic device not having the dissipation layer.

The electronic device 100 may include fewer, additional, or alternative display-related components. For example, in some cases, one or more components of the display unit 106 may also serve as the transparent cover 102. For instance, rather than having a separate, additional cover, one of the layers or components of the display unit may be used as an external display layer. For example, the external display layer may be or include an external polarizer of an LCD panel. The external polarizer may include a hard coating (e.g., powdered or nano-scale glass in a polymer binder) for protection during use. Alternatively or additionally, a color filter glass layer of the LCD panel may be configured and disposed to act as a glass substrate for the external display layer. In such cases, a touch sensor unit may be formed upon or added to the color filter glass layer in an in-cell touch sensor arrangement. Other touch display arrangements may be used.

Figure 2:
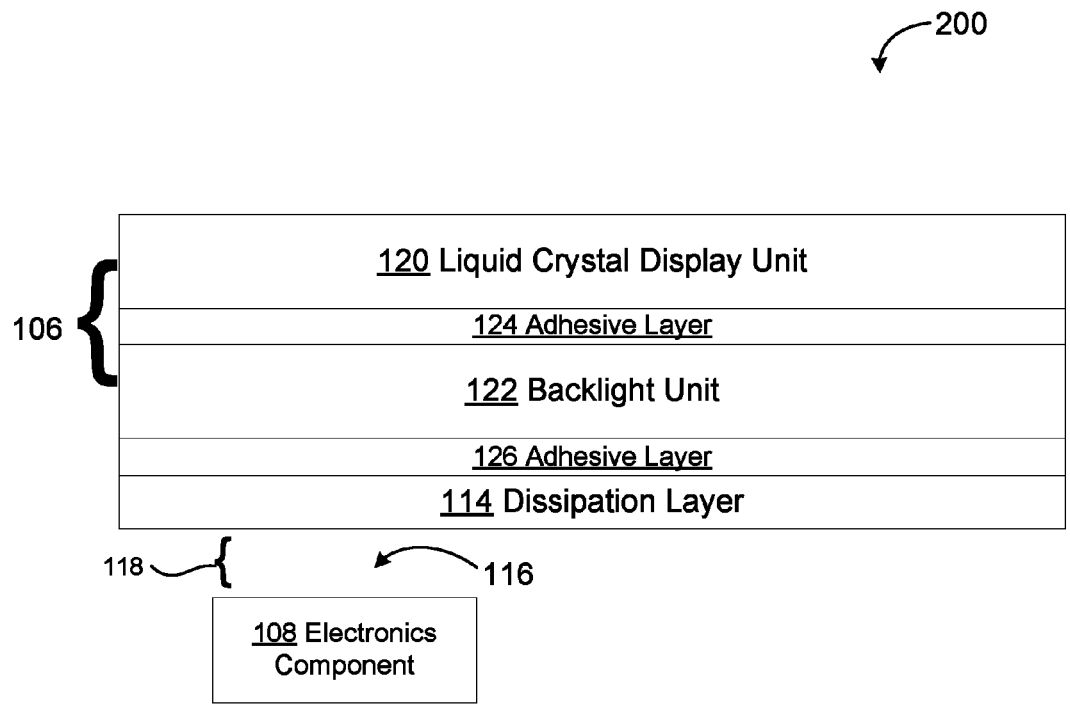
FIG. 2 depicts an example of a display unit and dissipation layer of an electronic device, where the display unit includes a liquid crystal display unit and backlight unit.

FIG. 2 depicts a cross-sectional view of an example of an electronic device 200 from FIG. 1, wherein the display unit 106 includes a LCD unit 120 and a backlight unit 122. The backlight unit 122 may include a light guide layer (or plate) and front and rear cladding layers (depicted in greater detail in FIG. 3). The backlight unit 122 may include any number of additional light management films or layers.

Adjacent units, layers, or other elements or components of the display unit 106 may be bonded together or otherwise secured to one another. For example, the transparent cover 102 or touch sensor unit 114 (in FIG. 1) may be bonded to the front or upper surface of the LCD panel 120. The LCD panel 120, may, in turn, be bonded to the backlight unit 122 of the display unit 106. Additionally, the backlight unit 122 may also be bonded or otherwise secured to the dissipation layer 114. Adjacent units or panels of the display unit 106 may be contiguous with one another with the exception of an adhesive layer or film therebetween.

Each layer or subunit of the display unit 106 may also be configured as a solid or laminated stack of layers or films.

For example, as depicted in FIG. 2, adhesive layers 124, 126 are used to secure adjacent units to one another. The bonding of adjacent units may lead to the absence of air gaps therebetween. Additionally, the constituent layers or films of the backlight unit 122 may be bonded to one another.

In certain examples, the adhesive layers 124, 126 may include one or more pressure-sensitive adhesive materials. Additional or alternative types of adhesive materials and films may be used, including, for instance, moisture or thermally cured adhesive materials. The adhesive materials of the adhesive layers 124, 126 may be silicone-based, epoxy-based and/or acrylic-based materials. In certain examples, the adhesive layer 126 disposed between the backlight unit 122 and dissipation layer 114 may be a liquid optically clear adhesive (OCA) or an optically clear adhesive tape. The OCA may be advantageous because the OCA is compatible with both surfaces and has smooth properties.

Figure 3:
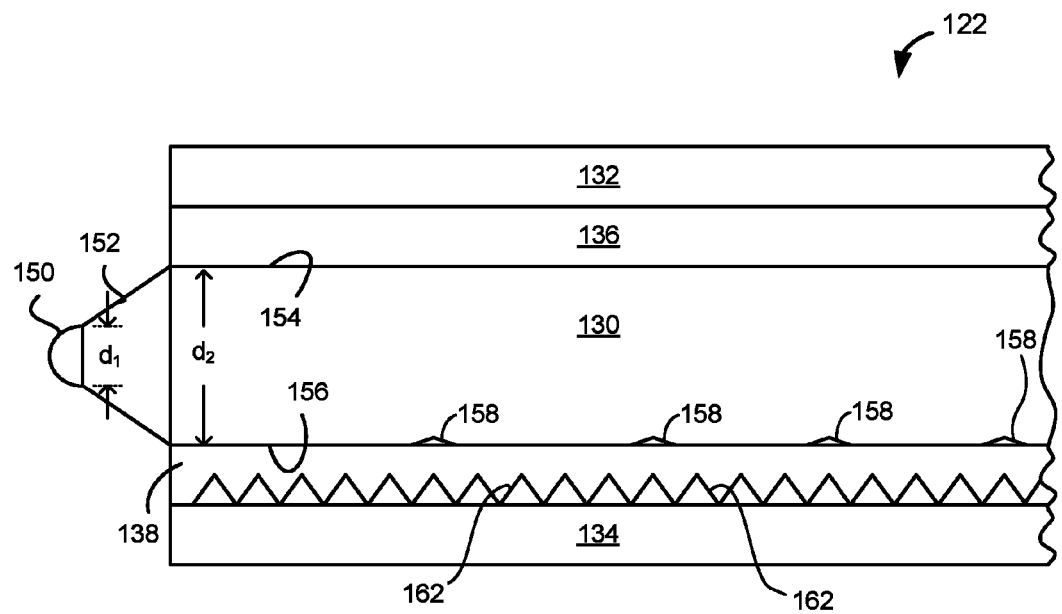
FIG. 3 depicts an example of a backlight unit.

FIG. 3 depicts a cross-section view of the backlight unit 122 in greater detail, wherein the layers or films of the backlight unit 122 are bonded to one another to form a solid or laminated backlight unit. Such a backlight unit 122 is advantageous as it lacks air gaps between constituent layers thereof.

The backlight unit 122 is configured as an assembly of layers and other components bonded to a back surface of the LCD panel or display unit. The backlight unit 122 includes a light guide layer (or plate) 130, a diffuser film 132, a turning film 134, and front and rear adhesive or cladding layers 136, 138. The cladding layers 136, 138 are disposed on and along front and rear faces (or sides) of the light guide layer 130, respectively. The cladding layers 136, 138 may be adhesively secured to the front and rear faces.

Adjacent layers or films of the backlight unit 122 may be contiguous with one another with the exception of an adhesive layer or film therebetween. In the example of FIG. 3, the front and rear cladding layers 136, 138 are, in fact, adhesive layers or films. The front and rear cladding layers 136, 138 may thus be used to adhesively secure one or more films, layers, or structures to the light guide layer 130.

In the example of FIG. 3, the front cladding layer 136 adhesively secures a diffuser film 132 to the light guide layer 130 of the backlight unit 122. Additional, fewer, or alternative films or layers may be secured via the front cladding layer 136. For example, diffuser structures may alternatively be embedded, suspended, or otherwise incorporated into the front cladding layer 136.

In the example of FIG. 3, the rear cladding layer 138 adhesively secures a turning film 134 to the light guide layer 130. The turning film 134 carries or includes an array of turning structures. The turning structures may be disposed along the rear cladding layer 138. Additional, fewer, or alternative films or layers may be secured via the rear cladding layer 138. For example, the turning structures may be carried by a recycling film or other film or layer.

Lamination or other bonding of the constituent films or layers of one or more of the units of the backlight unit 122 may increase the solidity and/or rigidity of the display unit 106 and, thus, the device assembly. For instance, the lamination and resulting absence of air gaps within the backlight unit 122 may lead to a rigid and robust device. The stiffness or rigidity of the display unit 106 may support the transparent cover 102. Flexure or deflection of the transparent cover 102 may be minimized or prevented. The lack of flexure may protect the fragile films and layers of the various units of the display unit 106 during use.

As depicted in FIG. 3, the backlight unit 122 further includes one or more light sources 150 (e.g., LED sources) and one or more non-imaging concentrators 152 adjacent the light source(s) 150 to inject light into the light guide layer 130, where $d_1$ is the thickness of the concentrator 152 at the input, and $d_2$ is the thickness of the concentrator 152 at the output. Each light source 150 may be placed against a respective input facet of the non-imaging concentrator 152. The light source(s) 150 and the concentrator(s) 152 are disposed along one or more edges of the light guide layer 130. For instance, respective concentrator structure(s) may be disposed along two opposing edges of the light guide layer 130. Each concentrator 152 constrains light both in the plane of the light guide layer 130 and out of the plane. In some cases, a respective concentrator 152 may be provided for each light source 150. In other cases, each edge of the light guide layer 130 has a single concentrator 152 to accommodate all of the light sources 150 mounted to the edge. The concentrator(s) 152 may be discrete from, or integrated with, the light guide layer 130 to any desired extent.

The light guide layer 130 has a front face 154 and a rear face 156. The front face 154 corresponds with the upper or forward facing side of the light guide layer 130, which is closer or proximate to the viewer. The rear face 156 corresponds with the lower or rearward facing side of the light guide layer 130, which is farther or distal from the viewer. The light guide layer 130 may be a film or other plate, such as a thin film having a thickness that falls in a range from about 0.4 mm to about 0.6 mm. Other thicknesses may be used. For instance, the thickness of the light guide layer 130 may vary in accordance with, or as a function of, the aspect ratio of the light source(s) 150.

The light guide plate 130 includes a plurality of extraction features 158. Each structure may be or include an indentation in the rear face 156 of the light guide plate 130. Each indentation may be or include a prism-shaped indentation. For example, each indentation may be a flat-faced prism (e.g., a triangular prism). Each prism may be a shallow prism. Each prism includes an angled face positioned for interaction with the light reflectively propagating down the light guide layer 130. The angled face of each prism may be oriented at a shallow angle relative to the rear face 156. An angle may be considered shallow if the angle falls within a range of about 1 degree to about 5 degrees, such as about 2 degrees.

Once light is extracted from the light guide layer 130, the light may travel close to the plane of the light guide layer 130, inside the rear cladding layer 138, until the light intersects one of an array of turning structures 162. Each turning structure 162 may be or include a reflective structure that redirects the light upward toward the LCD panel 120.

In some cases, the front and rear cladding layers 136, 138 include respective adhesive materials. For example, the front and rear cladding layers 136, 138 may be composed of respective adhesive materials. The respective adhesive materials may, in turn, have respective refractive indices. In some cases, the adhesive materials may be disposed in a thin film adhesive layer. The thin film adhesive layer may include one or more pressure-sensitive adhesive materials. Additional or alternative types of adhesive materials and films may be used, including, for instance, moisture or thermally cured adhesive materials. The adhesive materials may be silicone-based, epoxy-based and/or acrylic-based materials. The adhesive materials may be used to laminate adjacent layers of a stack of backlight unit layers.

The adhesive material(s) may be low-index adhesive materials. Examples of low-index adhesive materials include low index silicone materials, such as a low index silicone encapsulant or acrylic adhesive, but other materials may be used. The silicone encapsulant may be used as the cladding layer 136, and the acrylic adhesive may be used as the cladding layer 138. A variety of other adhesive materials may be used for either cladding layer 136, 138. In still other cases, the index of refraction of the adhesive materials is about 1.2. Still other materials having refractive indices closer to 1.0 may be used.

Figure 4A:
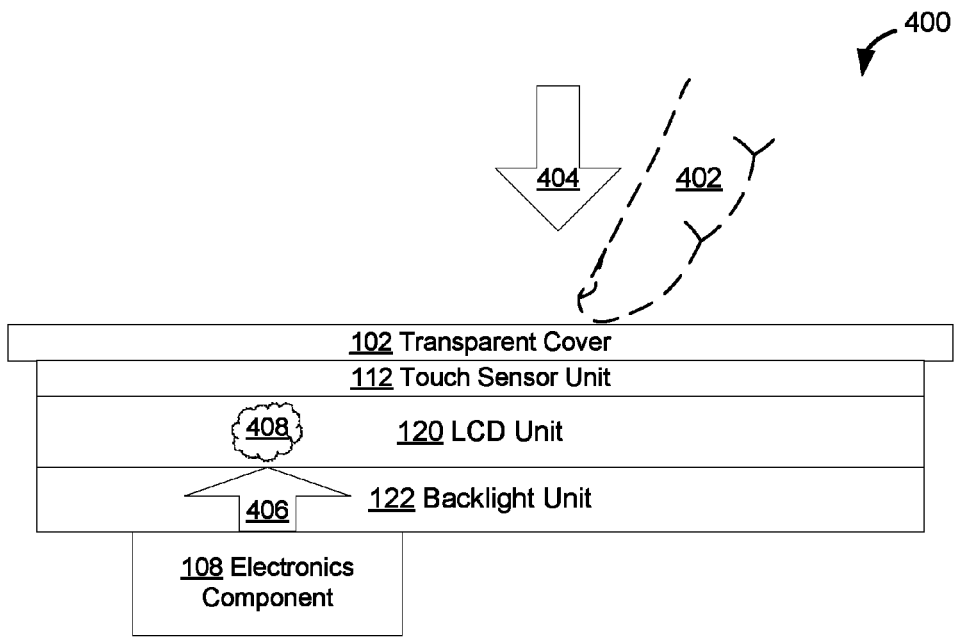
FIG. 4A depicts an example of liquid crystal pooling in a display device without a dissipation layer.
Figure 4B:
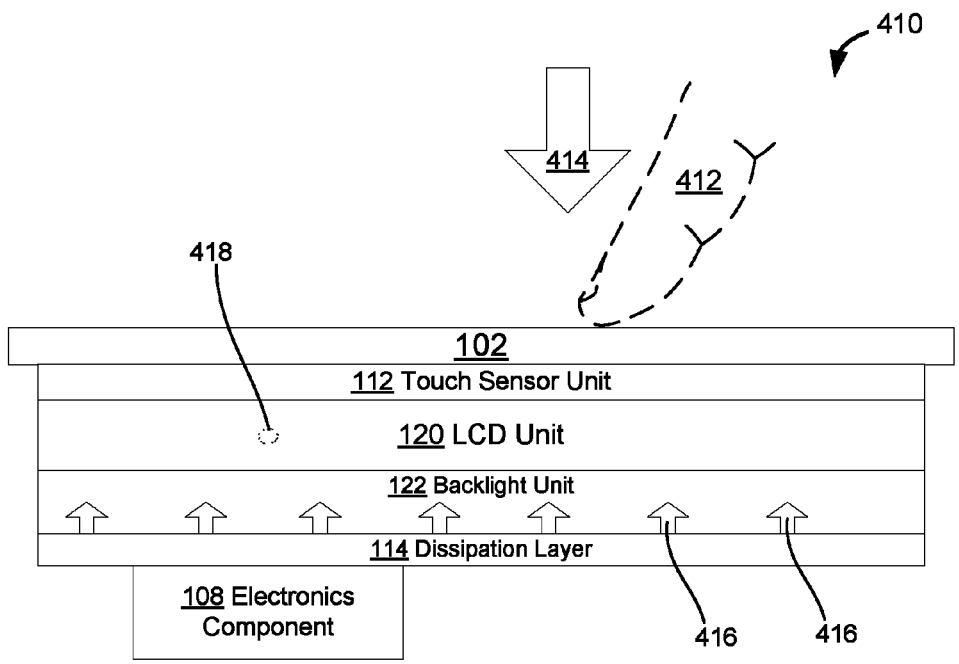
FIG. 4B depicts an example of reduced liquid crystal pooling in a display device with a dissipation layer.

FIGS. 4A and 4B depict differences in component pooling for electronic devices without and with a dissipation layer or backing layer. Specifically, FIG. 4A depicts an example 400 of potential liquid crystal pooling in an electronic device without a dissipation layer. As depicted, a user 402 presses down on the transparent cover 102 of the electronic device. An input force 404 is applied, where the transparent cover 102, touch sensor unit 112, LCD unit 120, and backlight unit 122 (as well as any intermediate adhesive layers) move downward in the z-direction and come in contact with an internal electronics component 108. The internal electronics component 108, being secured in place, provides an upward mechanical force 406 upon the surface of the backlight unit 122. The mechanical force is positioned above the internal electronics component 108 (as viewed along the z-axis), and not necessarily directly beneath the input force 404. Due to this contact with the backlight unit and the mechanical force 406 being applied, a visual distortion or pooling 408 results within the adjacent LCD unit 120.

FIG. 4B depicts an example 410 of reduced visual distortion or pooling in a display device with a dissipation layer. As depicted in FIG. 4B, a user 412 presses down on the transparent cover 102 of the electronic device. An input force 414 is applied (similar to the input force 404 in FIG. 4A), where the transparent cover 102, touch sensor unit 112, LCD unit 120, backlight unit 122, and dissipation layer 114 (as well as any intermediate adhesive layers) move downward in the z-direction and come in contact with an internal electronics component 108. The internal electronics component 108, being secured in place, provides an upward mechanical force 416 upon the surface of the dissipation layer 114. Due to the stiffness or rigidity of the dissipation layer 114, the mechanical force 416 is dissipated along the x,y-plane of the dissipation layer 114. This reduces the force being applied to a single location of the backlight unit 122 and adjacent LCD unit 120. As such, the component pooling or visual distortion 418 within the LCD unit 120 above the internal electronics component 108 (as viewed along the z-axis) is reduced and/or eliminated.

Exemplary Computing Environment

Figure 5:
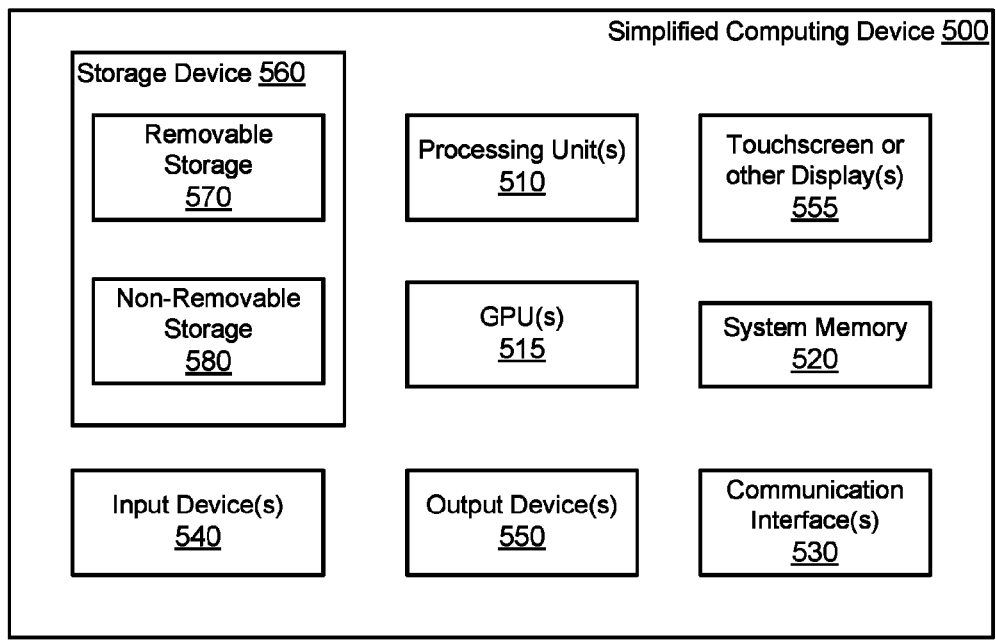
FIG. 5 is a block diagram of a computing environment in accordance with one example for implementation of the disclosed methods or one or more heat dissipation apparatuses.

With reference to FIG. 5, the dissipation or backing layer as described above may be incorporated within an exemplary electronic device or computing environment 500. The computing environment 500 may correspond with one of a wide variety of computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, or audio or video media players. In certain examples, the computing environment 500 is a wearable electronic device, wherein the device may be worn on or attached to a person's body or clothing.

The computing environment 500 has sufficient computational capability and system memory to enable basic computational operations. In this example, the computing environment 500 includes one or more processing unit(s) 510, which may be individually or collectively referred to herein as a processor. The computing environment 500 may also include one or more graphics processing units (GPUs) 515. The processor 510 and/or the GPU 515 may include integrated memory and/or be in communication with system memory 520. The processor 510 and/or the GPU 515 may be a specialized microprocessor, such as a digital signal processor (DSP), a very long instruction word (VLIW) processor, or other microcontroller, or may be a general purpose central processing unit (CPU) having one or more processing cores. The processor 510, the GPU 515, the system memory 520, and/or any other components of the computing environment 500 may be packaged or otherwise integrated as a system on a chip (SoC), application-specific integrated circuit (ASIC), or other integrated circuit or system.

The computing environment 500 may also include other components, such as, for example, a communications interface 530. One or more computer input devices 540 (e.g., pointing devices, keyboards, audio input devices, video input devices, haptic input devices, or devices for receiving wired or wireless data transmissions) may be provided. The input devices 540 may include one or more touch-sensitive surfaces, such as track pads. Various output devices 550, including touchscreen or touch-sensitive display(s) 555, may also be provided. The output devices 550 may include a variety of different audio output devices, video output devices, and/or devices for transmitting wired or wireless data transmissions.

The computing environment 500 may also include a variety of computer readable media for storage of information such as computer-readable or computer-executable instructions, data structures, program modules, or other data. Computer readable media may be any available media accessible via storage devices 560 and includes both volatile and nonvolatile media, whether in removable storage 570 and/or non-removable storage 580. Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the processing units of the computing environment 500.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

Claim Support Section

In a first embodiment, a device comprises a display unit, an internal electronics component, and a dissipation layer disposed between the display unit and the internal electronics component, wherein the dissipation layer is affixed to a surface of the display unit, and wherein the dissipation layer is configured to at least partially disperse a mechanical force applied by the internal electronics component on the display unit when an input force moves the dissipation layer into contact with the internal electronics component.

In a second embodiment, with reference to the first embodiment, the device further comprises a transparent cover, wherein the transparent cover is an external layer of the device and the display unit is disposed between the transparent cover and the dissipation layer, and wherein a coefficient of linear thermal expansion of the transparent cover is 0.5-2 times a coefficient of linear thermal expansion of the dissipation layer.

In a third embodiment, with reference to the first or second embodiment, the display unit comprises a liquid crystal display and a backlight unit.

In a fourth embodiment, with reference to the third embodiment, the backlight unit is a laminated backlight unit.

In a fifth embodiment, with reference to the first or second embodiment, the display unit comprises a light emitting diode (LED) unit or an organic light emitting diode (OLED) unit.

In a sixth embodiment, a device comprises a liquid crystal display (LCD) unit, a laminated backlight unit, and a dissipation layer affixed to a surface of the laminated backlight unit, wherein the laminated backlight unit is disposed between the LCD unit and the dissipation layer, and wherein the dissipation layer is configured to at least partially disperse a mechanical force applied by an internal electronics component on the laminated backlight unit when an input force moves the dissipation layer into contact with the internal electronics component.

In a seventh embodiment, with reference to the sixth embodiment, the device further comprises a transparent cover, wherein the transparent cover is an external layer of the device and the LCD unit is disposed between the transparent cover and the laminated backlight unit, and wherein a coefficient of linear thermal expansion of the transparent cover is 0.5-2 times a coefficient of linear thermal expansion of the dissipation layer.

In an eighth embodiment, a device comprises a transparent cover, an internal electronics component, a liquid crystal display (LCD) unit disposed between the transparent cover and the internal electronics component, a laminated backlight unit disposed between the LCD unit and the internal electronics component, and a dissipation layer disposed between the laminated backlight unit and the internal electronics component, wherein the dissipation layer is affixed to a surface of the laminated backlight unit and separated by an air gap from the internal electronics component in a first state, wherein the dissipation layer is configured to move into contact with the internal electronics component when an input force is applied to the transparent cover in a direction toward the laminated backlight unit, defining a second state, and wherein the dissipation layer is configured to at least partially disperse a mechanical force applied on the laminated backlight unit by the internal electronics component when the device is in the second state.

In a ninth embodiment, with reference to any of embodiments 1-8, the dissipation layer comprises steel (e.g., stainless steel), glass, ceramic, plastic (e.g., carbon-fiber reinforced plastic), aluminum, titanium, bronze, brass, copper, iron, beryllium, molybdenum, tungsten, silicon carbide, tungsten carbide, graphene, diamond, carbyne, or an alloy or combination thereof.

In a tenth embodiment, with reference to any of embodiments 1-9, the dissipation layer has a Young's modulus of at least 25 kN/mm$^2$.

In an eleventh embodiment, with reference to any of embodiments 1-10, the dissipation layer comprises a height of 1-100 micrometers.

In a twelfth embodiment, with reference to any of embodiments 1-11, the device further comprises an adhesive layer disposed between the dissipation layer and the display unit or backlight unit, wherein the adhesive layer is configured to affix the dissipation layer to the surface of the display unit or backlight unit.

In a thirteenth embodiment, with reference to the twelfth embodiment, the adhesive layer is an optically clear adhesive layer.

In a fourteenth embodiment, with reference to the twelfth embodiment, the adhesive layer comprises an acrylic resin.

In a fifteenth embodiment, with reference to any of embodiments 1-14, the internal electronics component comprises a vapor chamber, heat pipe, heat sink, heat fin, battery, processor, integrated circuit, or printed circuit board.

In a sixteenth embodiment, with reference to any of embodiments 1-15, the dissipation layer is a single layer of material that covers at least 50% of the surface of the display unit or backlight unit.

What is claimed is:

1. A device comprising:
    a display unit;
    an internal electronics component; and
    a dissipation layer disposed between the display unit and the internal electronics component,
    wherein the dissipation layer is affixed to a surface of the display unit and separated by an air gap from the internal electronics component in a first state,
    wherein the dissipation layer is configured to move into contact with the internal electronics component when an input force is applied to the display unit in a direction toward the internal electronics component, defining a second state, and
    wherein the dissipation layer is configured to at least partially disperse a mechanical force applied by the internal electronics component on the display unit when the device is in the second state.

2. The device of claim 1, wherein the dissipation layer comprises steel, glass, ceramic, plastic, aluminum, titanium, bronze, brass, copper, iron, beryllium, molybdenum, tungsten, silicon carbide, tungsten carbide, graphene, diamond, carbyne, or an alloy or combination thereof.

3. The device of claim 1, wherein the dissipation layer has a Young's modulus of at least 25 kN/mm$^2$.

4. The device of claim 1, wherein the dissipation layer comprises a height of 1-100 micrometers.

5. The device of claim 1, further comprising:
    an adhesive layer disposed between the dissipation layer and the display unit, wherein the adhesive layer is configured to affix the dissipation layer to the surface of the display unit.

6. The device of claim 5, wherein the adhesive layer is an optically clear adhesive layer.

7. The device of claim 5, wherein the adhesive layer comprises an acrylic resin.

8. The device of claim 1, wherein the display unit comprises a liquid crystal display and a backlight unit.

9. The device of claim 8, wherein the backlight unit is a laminated backlight unit.

10. The device of claim 1, wherein the display unit comprises a light emitting diode (LED) unit or an organic light emitting diode (OLED) unit.

11. The device of claim 1, wherein the internal electronics component comprises a vapor chamber, heat pipe, heat sink, heat fin, battery, processor, integrated circuit, or printed circuit board.

12. The device of claim 1, wherein the dissipation layer is a single layer of material that covers at least 50% of the surface of the display unit.

13. A device comprising:
a display unit;
an internal electronics component;
a dissipation layer disposed between the display unit and the internal electronics component; and
a transparent cover, wherein the transparent cover is an external layer of the device and the display unit is disposed between the transparent cover and the dissipation layer,
wherein the dissipation layer is affixed to a surface of the display unit,
wherein the dissipation layer is configured to at least partially disperse a mechanical force applied by the internal electronics component on the display unit when an input force moves the dissipation layer into contact with the internal electronics component, and
wherein a coefficient of linear thermal expansion of the transparent cover is 0.5-2 times a coefficient of linear thermal expansion of the dissipation layer.

14. A device comprising:
a liquid crystal display (LCD) unit;
a laminated backlight unit; and
a dissipation layer affixed to a surface of the laminated backlight unit and separated by an air gap from an internal electronics component of the device in a first state,
wherein the laminated backlight unit is disposed between the LCD unit and the dissipation layer,
wherein the dissipation layer is configured to move into contact with the internal electronics component when an input force is applied to the LCD unit in a direction of the laminated backlight unit, defining a second state, and
wherein the dissipation layer is configured to at least partially disperse a mechanical force applied by an internal electronics component on the laminated backlight unit when the device is in the second state.

15. The device of claim 14, further comprising:
an optically clear adhesive layer disposed between the dissipation layer and the laminated backlight unit, wherein the optically clear adhesive layer is configured to affix the dissipation layer to the surface of the laminated backlight unit.

16. The device of claim 14, wherein the dissipation layer comprises steel, glass, ceramic, plastic, aluminum, titanium, bronze, brass, copper, iron, beryllium, molybdenum, tungsten, silicon carbide, tungsten carbide, graphene, diamond, carbyne, or an alloy or combination thereof, and
wherein the dissipation layer has a Young's modulus of at least 25 kN/mm$^2$.

17. The device of claim 14, further comprising:
a transparent cover, wherein the transparent cover is an external layer of the device and the LCD unit is disposed between the transparent cover and the laminated backlight unit, and
wherein a coefficient of linear thermal expansion of the transparent cover is 0.5-2 times a coefficient of linear thermal expansion of the dissipation layer.

18. A device comprising:
a transparent cover;
an internal electronics component;
a liquid crystal display (LCD) unit disposed between the transparent cover and the internal electronics component;
a laminated backlight unit disposed between the LCD unit and the internal electronics component; and
a dissipation layer disposed between the laminated backlight unit and the internal electronics component,
wherein the dissipation layer is affixed to a surface of the laminated backlight unit and separated by an air gap from the internal electronics component in a first state,
wherein the dissipation layer is configured to move into contact with the internal electronics component when an input force is applied to the transparent cover in a direction toward the laminated backlight unit, defining a second state, and
wherein the dissipation layer is configured to at least partially disperse a mechanical force applied on the laminated backlight unit by the internal electronics component when the device is in the second state.

19. The device of claim 18, further comprising:
an optically clear adhesive layer disposed between the dissipation layer and the laminated backlight unit, wherein the optically clear adhesive layer is configured to affix the dissipation layer to the surface of the laminated backlight unit.

20. The device of claim 18, wherein the dissipation layer has a Young's modulus of at least 25 kN/mm$^2$, and
wherein a coefficient of linear thermal expansion of the transparent cover is 0.5-2 times a coefficient of linear thermal expansion of the dissipation layer.

* * * * *